US008474012B2

(12) United States Patent
Ahmed et al.

(10) Patent No.: US 8,474,012 B2
(45) Date of Patent: Jun. 25, 2013

(54) PROGRESSIVE CONSENT

(75) Inventors: Muzammil Ahmed, Seattle, WA (US); Prashant Agrawal, Kirkland, WA (US); Christopher C. White, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 270 days.

(21) Appl. No.: 12/964,758

(22) Filed: Dec. 10, 2010

(65) Prior Publication Data

US 2012/0151557 A1    Jun. 14, 2012

(51) Int. Cl.
G06F 7/04 (2006.01)
G06F 21/00 (2006.01)

(52) U.S. Cl.
USPC .................. 726/2; 726/27; 713/182

(58) Field of Classification Search
USPC ........................ 726/2, 27; 713/182
See application file for complete search history.

(56) References Cited

U.S. PATENT DOCUMENTS

| | | | |
|---|---|---|---|
| 7,076,558 B1 | 7/2006 | Dunn | |
| 7,269,853 B1 * | 9/2007 | Dunn | 726/27 |
| 8,265,959 B2 * | 9/2012 | McKenzie et al. | 705/3 |
| 2002/0120866 A1 * | 8/2002 | Mitchell et al. | 713/201 |
| 2006/0178913 A1 | 8/2006 | Lara et al. | |
| 2009/0089870 A1 | 4/2009 | Wahl | |
| 2009/0300746 A1 | 12/2009 | Ahn | |
| 2010/0235889 A1 * | 9/2010 | Chu et al. | 726/4 |

OTHER PUBLICATIONS

Heitmann, et al, "An architecture for privacy-enabled user profile portability on the Web of Data," retrieved at <<http://the-blank.net/contains/benjamin/files/Privacy-Enabled_User_Profile_Portability.pdf>>, Proceedings of the 1st International Workshop on Information Heterogeneity and Fusion in Recommender Systems, 2010, 8 pages.

Michelin, et al., "Distinction-Based and Verification-Assisted Knowledge Modeling," retrieved at <<http://the-blank.net/contains/benjamin/files/Privacy-Enabled_User_Profile_Portability.pdf>>, Third International Workshop on Requirements Engineering and Law (RELAW), Sep. 2010, 6 pages.

"Microsoft's Vision for an Identity Metasystem," retrieved at http://msdn.microsoft.com/en-us/library/ms996422.aspx>>, MSDN library, Microsoft Corporation, Redmond, Washington, May 2005, 8 pages.

Dixon, Mark, "Identity Management: Securing Information in the HIPAA Environment," retrieved at <<http://www.discoveringidentity.com/resources/Horizons_Identity_04.pdf>>, Sun Microsystems, Inc., Santa Clara, California, 2010, 31 pages.

"Introducing Windows CardSpace," retrieved at http://msdn.microsoft.com/en-us/library/aa480189.aspx, MSDN library, Microsoft Corporation, Redmond, Washington, Apr. 2006, 13 pages.

* cited by examiner

*Primary Examiner* — Mohammad W Reza (57) ABSTRACT

A consent management system is described which manages an entity's consent to consume application functionality on a per-feature level of granularity. To perform this task, the consent management system maintains consent information which describes a plurality of use conditions associated with the features of the application functionality. In one case, the consent information has a hierarchical data structure that identifies a hierarchy of application features. In operation, the consent management system accesses the content information whenever an entity seeks to access a particular application feature; it grants or denies access to the feature based on the consent information. The consent management system also includes a consent maintenance module that allows an administrator (or other entity) to cancel or modify any use condition in the consent information.

20 Claims, 10 Drawing Sheets

PROGRESSIVE CONSENT

BACKGROUND

An administrator of a computer service (such as a computer application, web site, etc.) may associate a use condition with the computer service. The use condition may include contractual terms which govern the use of the service by end users. In some cases, for example, a use condition may describe the manner in which a provider of the computer service is permitted to use any information supplied to the computer service by the users.

In typical examples, the computer service may ask a user to expressly accept or decline the use condition, e.g., by clicking on an accept button providing by a user interface presentation. If the user accepts the use condition, the computer service will permit the user to interact with all of the features of the computer service. If the user declines the use condition, the computer service will preclude the user from interacting with any of the features of the computer service. By virtue of this common provision, the administrator can reduce its liability in providing the computer service to the end users and/or achieve other objectives.

SUMMARY

An environment is described herein in which different application features are associated with separate use conditions. A consent management system manages access by entities (such as end users) to the application features in a manner which takes into account the association of the use conditions with the application features.

In an illustrative manner of operation, the consent management system receives a request from an entity (such as an end user) to access an application feature provided by application functionality. In response, the consent management system consults consent information to determine whether the entity has previously given consent to a current use condition which pertains to the requested feature, and whether that previously given consent is effective with respect to a present circumstance in which the entity seeks to use the requested feature. If the entity has previously given presently-effective consent, the consent management system permits the entity to access the requested feature. If the entity has not previously given presently-effective consent, the consent management system may decline access to the requested feature by the entity. The consent management system can then invoke a consent experience designed to solicit the entity's consent to the application feature in question.

By virtue of the above-described approach, a provider of application functionality can empower individual users to provide consent in a focused and fine-grained manner. For instance, a user can agree to a particular use condition if he or she determines that the benefits of granting consent outweigh the potential costs (such as privacy-related costs). Moreover, if the user declines to grant consent, the user is nevertheless not blocked from using the application functionality in wholesale fashion.

In one implementation, the consent management system determines whether the entity's previously given consent is effective based on a consideration of one or more policy attributes of the use condition for the requested feature. For example, the consent management system can determine whether a time at which the entity seeks to use the requested feature satisfies a temporal attribute of the applicable use condition. In addition, or alternatively, the consent management system can determine whether a device with which the entity seeks to access the requested feature satisfies an access-related attribute of the use condition.

In one implementation, the consent information is expressed by a consent data structure. The consent data structure may describe either a flat or a hierarchical arrangement of application features and associated use conditions.

In another implementation, the consent information identifies a plurality of use terms. The consent information further includes a mapping structure which maps the use terms to use conditions associated with the respective application features.

The consent management system may also include a consent maintenance module. That module is configured to receive an instruction (e.g., by an administrator) to cancel or modify any use condition that applies to any application feature. In response, the consent maintenance module can revoke any consent given by any entity with respect to the canceled or modified use condition. This revocation may result in the entities being subsequently asked to reassert their prior consent to the application feature.

According to one illustrative use scenario, the application functionality pertains to a health-related field.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative consent management system which governs access to application functionality on a per-feature level of consent granularity or a per-use-term level of consent granularity. Section B describes illustrative methods which explain the operation of consent management system of Section A. Section C describes illustrative processing functionality that can be used to implement any aspect of the features described in Sections A and B.

Figure 13:
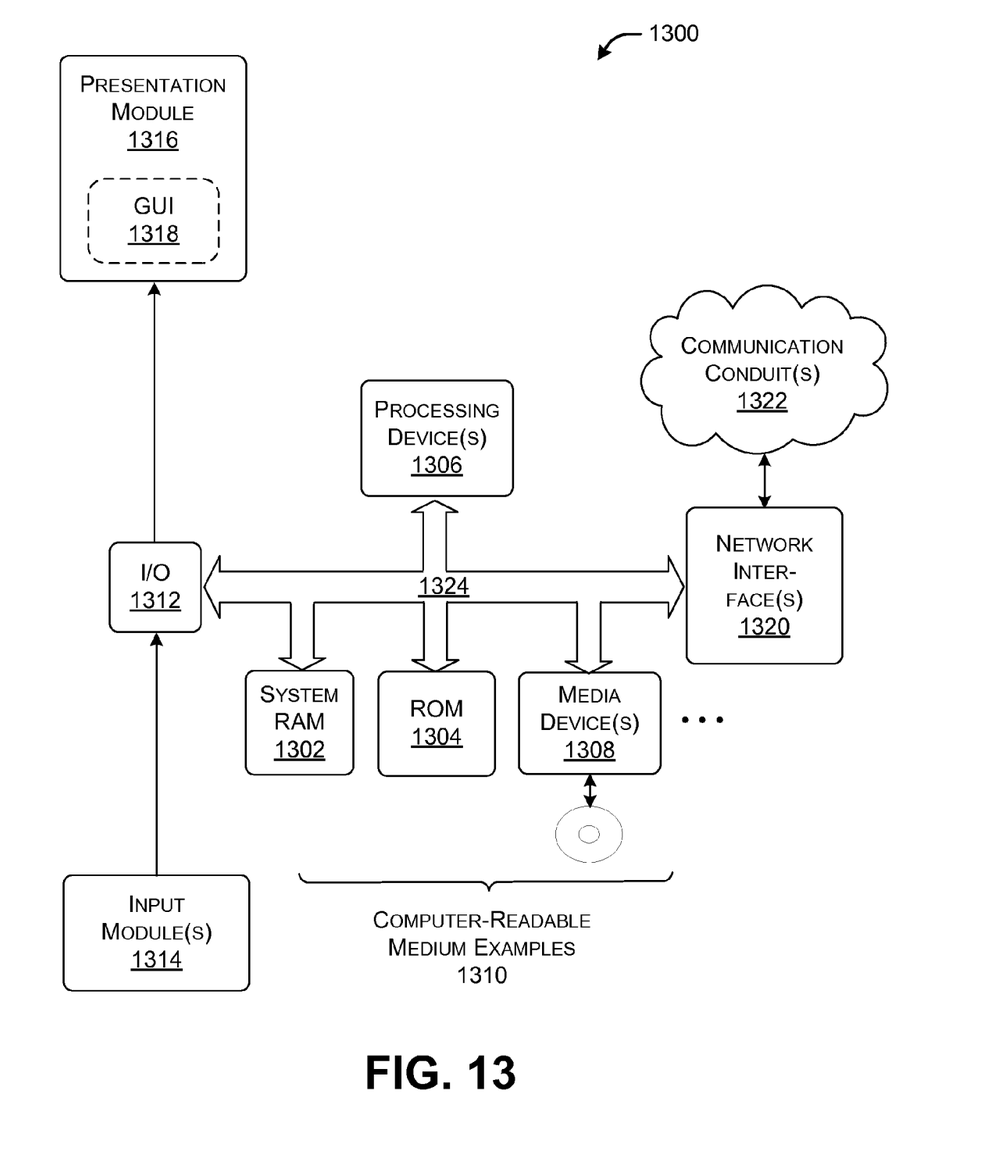
FIG. 13 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms (e.g., using software, hardware, firmware, etc. or any combination thereof). In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 13 to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms (e.g., using software, hardware, firmware, etc. or any combination thereof).

As to terminology, the phrase "configured to" encompasses any way that any kind of physical and tangible functionality can be constructed to perform an identified operation. The functionality can be configured to perform an operation using, for instance, software, hardware, firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware, firmware, etc., and/or any combination thereof. When implemented by a computing system, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

A. Illustrative Consent Management System

Figure 1:
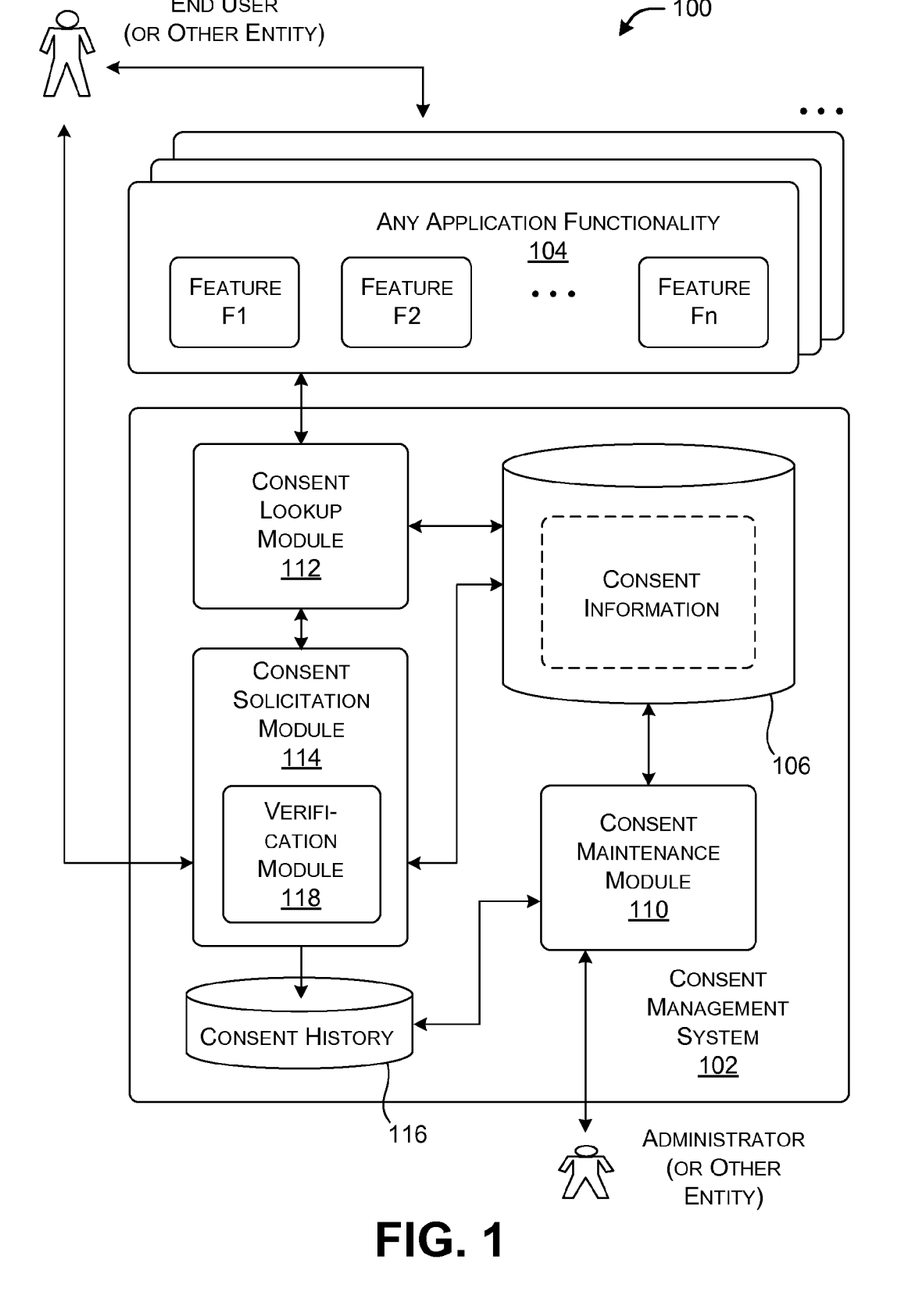
FIG. 1 shows an illustrative consent management system for managing consent on a per-feature level granularity (or a per-use-term level of granularity).

FIG. 1 shows an illustrative environment 100 that includes a consent management system 102 that governs the consumption of application features by any entities, such as end users. The application features correspond to any components of application functionality 104. FIG. 1 generically represents the application features as components F1, F2, . . . Fn.

From a high-level perspective, an application provider or other appropriate agent can assign separate use conditions to separate respective application features. In this environment 100, the consent management system 102 can perform various management roles, such as by granting and denying access to application features on a per-feature level of consent granularity (or a per use-term-level of consent granularity), updating use conditions, and so on.

The term application functionality encompasses any computer-implemented service of any type. For example, application functionality may correspond to one or more computer applications for performing any functions, including functions typically regarded as low level (e.g., operating system functions) and higher-level consumer-oriented functions. In another case, application functionality may correspond to one or more network-accessible resources (e.g., web site functionality, web service functionality, virtual desktop functionality, and so on). In any of these examples, an application feature may correspond to any module, workflow, task, use case, user interface page, etc. associated with any application functionality.

A "use condition" refers to any term or terms under which the entity is permitted to use an application feature. In one case, a provider of the application feature may define a use condition for any reason. For example, a provider may wish to impose a use condition for the primary purpose of reducing its legal liability associated with the use of its services by the entities. In addition, or alternatively, the provider may also define use conditions that benefit the entities, e.g., by clarifying the consequences of the entities' consumption of an application feature. The use conditions may or may not be legally binding in a particular jurisdiction.

More specifically, in some cases, a use condition may specify the manner in which the provider is permitted to use information provided by the entities. That information may potentially include personal information. Alternatively, or in addition, a use condition may specify the liability of the provider in the event that there is an error or anomaly in the delivery of an application feature (e.g., providing an "agree to hold harmless" type of clause). Alternatively, or in addition, a use condition may specify obligations of the entity who utilizes an application feature, or obligations of the provider, and so on. No constraints are placed on the characteristics of use conditions that different providers can place on the consumption of their application features.

A use term refers to an individual component of a use condition. In one example, a use condition may include a single use term. In other cases, a use condition may include two or more use terms.

As used herein, the term consent corresponds to any indication, provided by an entity, of whether the entity has agreed to a particular use condition for a particular application feature. In one case, an entity may provide consent to a feature on a per-feature level of consent granularity. In another case, an entity may provide consent to a feature on a per-use-term level of consent granularity. Hence, any future reference to providing consent for a particular feature is to be understood as encompassing at least these two embodiments.

Further, as used herein, an entity is considered as having given consent if the entity provides consent in either a direct manner or indirect manner. An entity gives consent in a direct manner by personally providing the consent. Any entity gives consent in an indirect manner, for instance, when some delegate who is duly authorized to give consent for the entity provides the consent on behalf of the entity.

In one case, the consent management system 102 can be implemented as a separate component from the application functionality 104. For example, a central consent management system 102 can provide management services to plural different computer applications or web sites. In this case, the consent management system 102 can be located at the same location as the application functionality 104, or at a different location from the application functionality 104, or some combination thereof. In another case, the consent management system 102 can be implemented, at least in part, as a component of the application functionality 104 itself. In both cases, the application functionality 104 and the consent management system 102 cooperate to manage the entity's consumption of application features in the manner specified below.

To function as described, the consent management system 102 includes a data store 106 which maintain consent information. The consent information can maintain any information regarding the use conditions associated with the application features. For example, the consent information can optionally identify, for each application feature, the use condition which applies to the application feature. The consent information can identify the application features in any manner, such as by providing feature identifiers that are associated with the application features. In addition, or alternatively, the consent information can optionally identify the entities who have granted consent to the use conditions. In addition, or alternatively, the consent information can identify the terms associated with the use conditions, and so on.

To simplify the explanation, FIG. 1 depicts the consent information as a singular and integral source of consent-related content. And indeed this may correspond to one implementation of the consent management system 102. But in other cases, the consent information can be distributed over plural locations and maintained by separate modules. The individual features of the application functionality 104 may themselves maintain some of the content referred to as consent information herein. In view of this liberal interpretation, the data store 106 can encompass plural and possibly distributed storage units (not shown).

Figure 4:
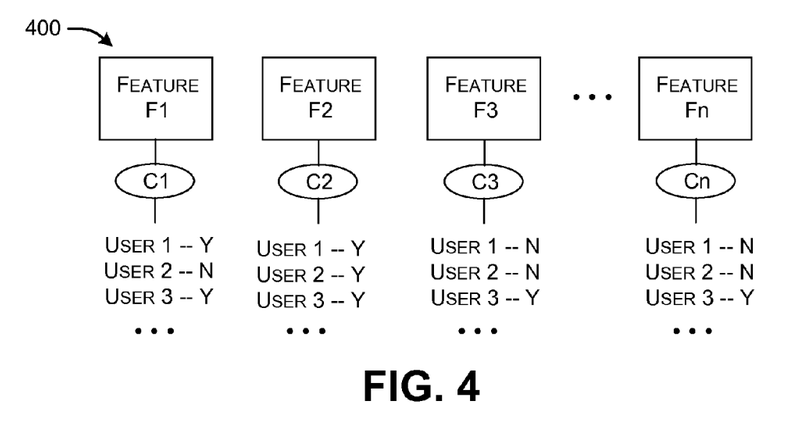
FIG. 4 shows an example of consent information that does not have a hierarchical structure.
Figure 5:
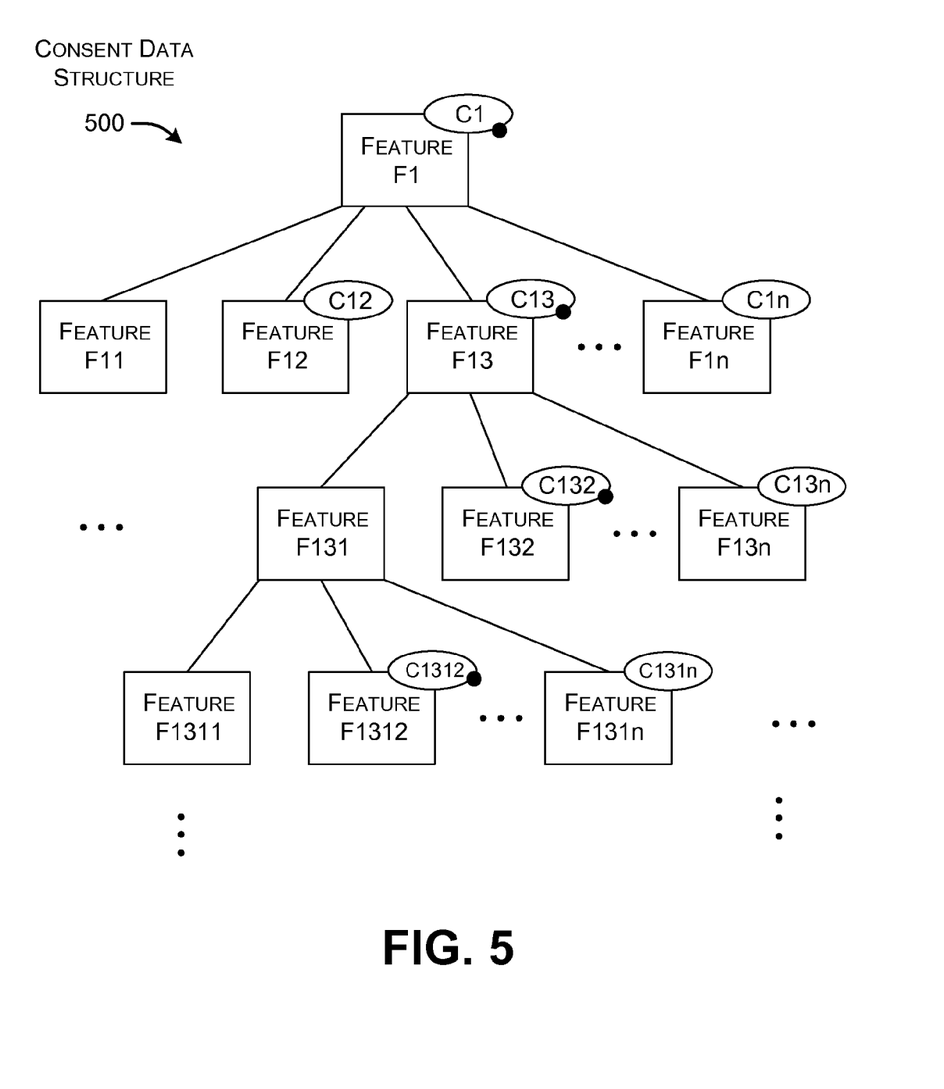
FIG. 5 shows an example of consent information that has a hierarchical structure, thereby forming a consent data structure.

In some cases, the consent information can be implemented in a generally non-structured manner. In another case, the consent information can be organized based on any type of consent data structure. For example, the consent structure can describe a hierarchical manner of organizing features and associated use conditions. FIGS. 4 and 5 provide additional information regarding two illustrative techniques for organizing content within the consent information.

The consent management system 102 also includes a consent maintenance module 110. The consent maintenance module 110 can be used by an administrator or other authorized agent to initially define all (or some) of the use conditions in the consent information that apply to the application features of the application functionality 104. Thereafter, the administrator can selectively cancel or modify any or all use conditions. Cancellation may entail permanently removing a use condition or just reinitializing (e.g., resetting) a use condition. The following explanation will set forth the possible consequences of such administrative operations.

A consent lookup module 112 receives a lookup request whenever the entity attempts to access an application feature of the application functionality 104. This function can be implemented in different ways. In one case, each application feature can include a link or the like which points into the consent management system 102. That link can identify the application feature. When the entity attempts to access an application feature, the application functionality 104 can activate the link to call into the consent lookup module 112.

Once invoked, the consent lookup module 112 accesses the consent information in the data store 106 to determine: a) the use condition associated with the application feature in question (if, in fact, this information is not already expressed by the application feature itself); and b) whether the entity has previously given presently-effective consent to this use condition. There are two possibilities. First, the consent lookup module 112 determines that the entity has given presently-effective consent. In this case, the consent lookup module 112 permits the entity to access and utilize the application feature without interruption. For example, the entity may be unaware that a consent-checking operation has been performed.

Alternatively, the consent lookup module 112 can determine that the entity has not given prior consent to the relevant use condition (in its current form), or the entity has given prior consent, but that consent is not effective for the present circumstance in which the entity seeks use to feature in question. If so, the consent management system 102 can invoke a consent solicitation module 114. The consent solicitation module 114 provides a user experience by which the entity is asked to provide consent. If the entity responds by providing consent, the consent solicitation module 114 can record this consent in the consent information. The consent solicitation module 114 can also record the consent in a consent history provided in the data store 116. The consent information that is recorded in the consent history can include any information regarding the consent, such as the identity of the use condition (e.g., by identifying a GUID assigned to the use condition), the version of the use condition, the identity of the entity, the time at which the entity granted consent, evidence of consent (to be described below), and so on. At any time, an administrator can inspect the consent information stored in the consent history. An entity may also inspect the consent that it has provided.

In some implementations, the consent lookup module 112 can determine whether the entity has given consent to a use condition by making reference to a single field associated with the use condition. In that case, that field provides a binary indication of whether or not the entity has given consent to the feature in question.

In other implementations, the consent lookup module 112 can determine whether the entity has given consent to a use condition based on an examination of plural policy attributes associated with the use condition. The attributes describe circumstances that qualify the granting of consent by the entity. For example, a use condition may have a temporal attribute which indicates that the entity's consent is only valid for a specified span of time; the consent expires thereafter (but an administrator can also revoke the consent at any time, for any reason). A use condition may also have an access-related attribute which states that an entity has given consent only when the entity accesses the feature via a specified user device, and so on. These policy attributes are cited by way of example, not limitation. Other implementations can make use of other policy attributes, such as location-based access restrictions.

The consent information can enumerate the policy attributes of the use conditions in any manner and in any level of detail. Further, the consent solicitation module 114 can allow an entity to provide consent on an attribute-level of granularity. For example, a first entity may provide consent that enables it to use a certain feature for a year, while a second entity may provide consent that enables it to use a certain feature for only a month. Similarly, a first entity may provide consent that enables it to use a certain feature using any user device, while a second entity can provide consent that enables it to use a certain feature using only a particular type of device. The consent information can record the entity's consent in any level of granularity. Alternatively, or in addition, the consent information can apply a stock set of attributes which apply to all entities without variation. For example, the consent information can specify that the consent given by any entity for a particular feature is valid for three months from the time of consent, upon which the entity is requested to re-assert consent.

When policy attributes are in use, the consent lookup module 112 can determine: a) whether the entity has given prior consent; and b) whether the prior consent applies to a present circumstance in which the entity seeks to use the feature. For example, the entity may have given prior consent, but that prior consent is not effective because the entity's consent has expired, or the entity seeks to access the feature using a user device that is not contemplated by the prior consent, and so on.

Finally, FIG. 1 indicates that the consent solicitation module 114 includes a verification module 118. The verification module 118 provides appropriate functionality to verify that the entity which provides consent is, in fact, the entity it asserts itself to be. The verification module 118 can provide various tools to accomplish this goal, set forth in greater detail below. The verification module 118 collects evidence based on appropriate proof submitted by the entity. The consent solicitation module 114 stores this evidence in the consent history. Such evidence can be useful in the event that the entity attempts to repudiate the fact that it has given consent.

Figure 2:
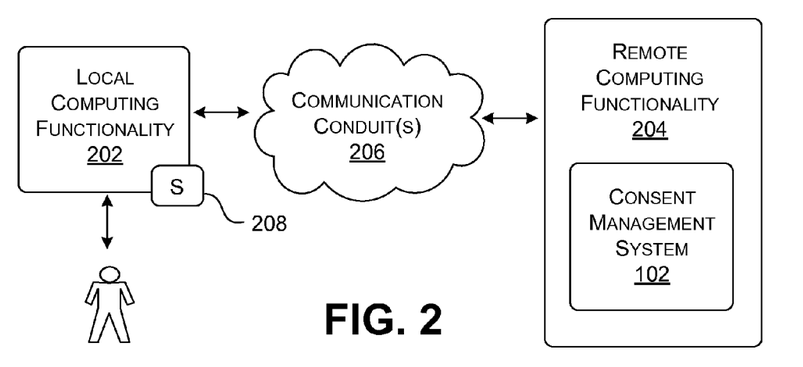
FIGS. 2 and 3 describe two different illustrative implementations of the consent management system of FIG. 1.
Figure 3:
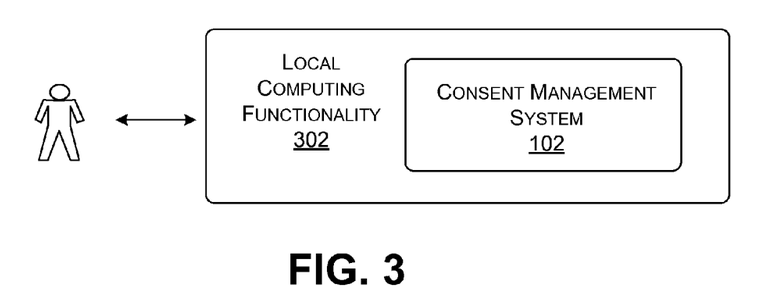

FIGS. 2 and 3 describe two among many possible implementations of the consent management system 102 of FIG. 1. In the case of FIG. 2, local computing functionality 202 is connected to remote computing functionality 204 by one or more networks 206. The remote computing functionality 204 can implement the application functionality 104 (not shown in FIG. 2) with which the entity seeks to interact, as well as the consent management system 102. In this example, the application functionality 104 can be implemented at the same remote site as the consent management system 102 or at a different remote site, or a combination thereof.

Alternatively, the local computing functionality 202 can implement the application functionality 104, and the remote processing functionality 204 can implement the consent management system 102. Alternatively, the local computing functionality 202 can implement the consent management system 102 and the remote computing functionality 204 can host the application functionality 104. Alternatively, either the application functionality 104 or the consent management system 102 (or both) can be distributed between the local computing functionality 202 and the remote computing functionality 204. Still other allocations of services are possible.

For example, in another case, the remote processing functionality 204 can store the consent information that enables the entity to access the features of the application functionality via the local computing functionality 202. But the remote computing functionality can also download appropriate consent information to the local computing functionality 202 which enables the entity to access the application features when operating in an offline mode (where the assumption is made that the application features are also locally available to the entity in this offline mode).

The local computing functionality 202 may represent any type of computing device, such as, without limitation, a personal computer, a workstation device, a personal digital assistant device, a telephone device, an ebook reader device, a tablet-type computing device, a game console device, a set-top box device, and so on. The remote computing functionality 204 may correspond to one or more server-type computing devices, one or more data stores, routing functionality, and so on. As stated above, resources associated with the remote computing functionality 204 can be provided at a single site or distributed over plural sites. The network 206 can correspond to a local area network, a wide area network (e.g., the Internet), etc., or some combination thereof.

FIG. 3 shows an example in which local computing functionality 302 implements both the application functionality 104 (not shown) and the consent management system 102. The local computing functionality 302 can correspond to any of the computing devices described above with respect to FIG. 2.

FIG. 4 shows a first implementation of consent information 400. As stated above, the consent information 400 can generally encompass any information which enables the consent management system 102 to grant access to application features on a per-feature level of granularity. Further, the consent information 400 can be distributed and managed across plural storage locations in any manner.

As shown, the consent information 400 can optionally identify the application features of the application functionality 104, e.g., by providing feature identifiers associated with the application features. FIG. 4 depicts the information which represents the features using labels F1, F2, F3, and Fn. The consent information 400 can also optionally identify the use conditions which have been assigned to the features. FIG. 4 depicts the information which represents the use conditions using labels C1, C2, C3, and Cn. The consent information 400 can also optionally identify the entities who have given consent to each use condition, and so on.

The use conditions (C1, C2, etc.) can be formulated to include only those terms that are appropriate for their associated application features. For example, the use condition C1 can include terms that are appropriate for the functions performed by the application feature F1, the use condition C2 can include terms that are appropriate for the functionality performed by the application feature F2, and so on.

In the example of FIG. 4, the consent information has a generally non-structured or "flat" format. That is, the consent information 400 does not convey information regarding the relationships among application features or the relationships among use conditions. Nevertheless, the different application features can have different scopes of applicability. For example, the application feature F1 may correspond to a frequently-used workflow provided by the application functionality 104, while the application feature F2 may correspond to a lesser-used workflow that handles a relatively specialized workflow.

FIG. 5 shows another example of consent information which contains the same content as in FIG. 4, but which formulates that content as a consent data structure 500. That is, the consent data structure 500 identifies the relationships among application features and associated use conditions.

Different data structures may be appropriate to organize the granting of consent for different respective applications. In this particular example, the consent data structure 500 describes a hierarchical organization of application features and associated use conditions.

More specifically, as conveyed by the consent data structure 500, the application functionality 104 has a top-level root node associated with feature F1. Feature F1 may correspond to an omnibus feature which encompasses all of the individual features associated with the application functionality 104. In a second level, the application provides features F11, F12, F13, etc. These second-tier features are child application features with respect to the root application feature F11. Each child application feature, in turn, may include its own child application features. For example, the application feature F13 includes child application features F131, F132, etc. The consent data structure 500 can represent the features in the manner specified above, e.g., by providing feature identifiers associated with the features.

After defining such a hierarchy, the administrator can then assign use conditions to at least a subset of the application features. For example, in the case of FIG. 5, the administrator has assigned use condition C1 to the root application feature F1. This use condition may describe general terms which pertain to the use of the application functionality 104 in general. The administrator may then assign use condition C12 to application feature F12, use condition C13 to application feature F13, and so on. Any use condition assigned to a child application features may govern features that are particular to those application features.

The consent data structure 500 can also identify the entities who have consented to each use condition in the same manner shown above with respect to FIG. 4. But to simplify the depiction, FIG. 5 illustrates the use conditions to which only one entity has consented. Namely, FIG. 5 adds a black dot to each use condition to which this entity has consented. This entity has consented to use conditions C1, C13, C132, and C1312.

By granting explicit consent with respect to a usage condition associated with a parent application feature, the entity gives implicit consent to its child application features. For example, the entity has granted consent with respect to use condition C1 associated with application feature F1. The child application feature F11 does not have a separate use condition associated therewith. This means that the entity is permitted to use feature F11 under the terms of the use condition C1. But the entity is not permitted to use feature F12 because that application feature has its own use condition C12 for which the entity has not given consent. The entity can address this issue by giving consent to condition C12, upon which he or she is permitted to use the feature F12.

As can be appreciated, different entities will give consent to different respective sets of use conditions. The consent data structure 500 can store the consents provided by entities for each application feature, e.g., by storing a entity consent list for each application feature. For example, a consent list for the application feature F12 can identify the entities who have given consent to use condition C12. Different policy attributes may apply to each use condition in the manner specified above.

Other data structures can be used to structure the administration of consent for an application. For example, another data structure can provide a hierarchy of nodes associated with use conditions, as opposed to application features. Each use condition in such a hierarchy can identify the application features to which it applies.

Consider now the consequences of an administrator's cancellation or modification of use conditions within the consent data structure 500. For example, assume that the administrator updates the root node use condition C1, or simply "resets" the use condition C1. This use condition pertains to the application functionality 104 as a whole. Hence, after this change, the consent management system 102 will ask each entity to reassert consent with respect to application feature F1 when the entity next attempts to access the application feature F1 (where feature F1 effectively corresponds to the application functionality 104 as a whole). In this situation, assume further that some entities have previously given consent to child application features, such as the use condition C13 associated with the child application feature F13. The consent management system 102 will not ask such an entity to reassert consent to this use condition C13 unless it has changed, even though the use condition C1 has changed. However, as stated above, the entity cannot use any application feature until he or she reasserts consent to the global use condition C1.

Now assume that the administrator decides to change the use condition associated with a child application feature, such as the use condition C132 associated with application feature F132. The consent management system 102 will respond by asking the entity to reassert consent to the use condition C132 whenever the entity next attempts to access the application feature F132. But the administrator's modification will not affect the entity's previous consent given with respect to any parent or ancestor application feature (with respect to application feature F132), or with respect to any child application features (with respect to application feature F132).

Changes to the use conditions affect the consent information 400 shown in FIG. 4, but in a more straightforward manner. Namely, a change to any use condition will affect the corresponding application feature to which it pertains, but not others.

Figure 6:
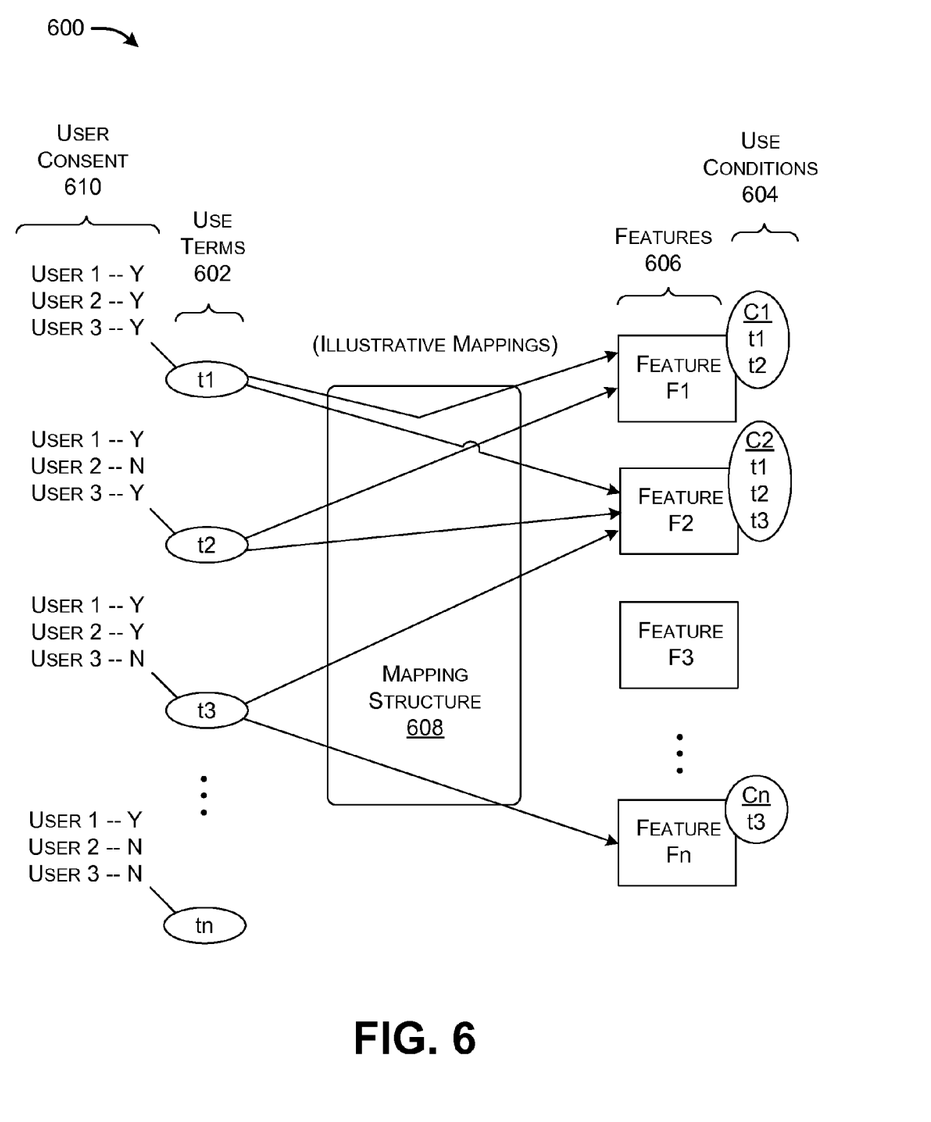
FIG. 6 shows an example of consent information that includes a mapping structure that maps use terms to use conditions associated with respective application features.

FIG. 6 shows another implementation of the consent information, namely represented by consent information 600. In this case, the consent information 600 specifies a variety of component use terms 602. The use terms 602 correspond to individual contractual terms. Use conditions 604 associated with respective features 606 are composed of selected use terms 602. A mapping structure 608 maps the use terms 602 to the individual features 606. Entities provide consent on a per-term-level of granularity, as indicated in FIG. 6 by the column labeled user consent 610.

For example, in this merely illustrative example, the mapping structure 608 indicates that use condition C1 (associated with feature F1) is composed of use terms t1 and t2. This means that user 1 and user 3 are permitted to access feature F1, because both of these users have consented to use terms t1 and t2. But user 2 cannot access feature F1, because it has not consented to use term t2. An entity who consents to all use terms is allowed to access all features.

Considered as a whole, the feature-level management of consent may have various benefits. First, different use conditions may present the entity with different obligations, risks, impositions, etc. This ensues from the different characteristics of the functions invoked by the application features. This means that the entity may regard different use conditions with different levels of potential objection or hesitation. By partitioning consent into multiple parts, the administrator can enable the entity to select the mix of use conditions with which he or she feels most comfortable after weighing the costs and benefits of these use conditions. And even if the entity declines some use conditions, the entity is not precluded from interacting with the application functionality 104 in wholesale fashion.

Second, by providing per-feature use conditions, the administrator may be able to more efficiently add, cancel, and modify use conditions. And these changes can be made with a reduced amount of disruption to individual entities. For example, assume that the administrator determines that it is appropriate to modify a deeply embedded use condition in the hierarchy of FIG. 5. This change will not affect that portion of the user population who do not use the corresponding application feature.

Third, by providing per-feature use conditions, the administrator may be able to more effectively convey the nature of consent terms to the entity. For example, the consent management system 102 enables the administrator to present a brief and to-the-point use condition to the entity that is tailored to his or her targeted use of the application functionality 104. Further, the consent management system 102 can present the use condition at the time that the entity is planning to use the application feature in question. All of these factors may effectively focus the entity's attention on the relevant terms of the use condition, as opposed to, for example, presenting a global use condition in an upfront manner that governs access to the application functionality 104 as a whole.

The above potential characteristics are presented by way of example, not limitation. The consent management system 102 may offer yet other benefits to entities and administrators.

Figure 7:
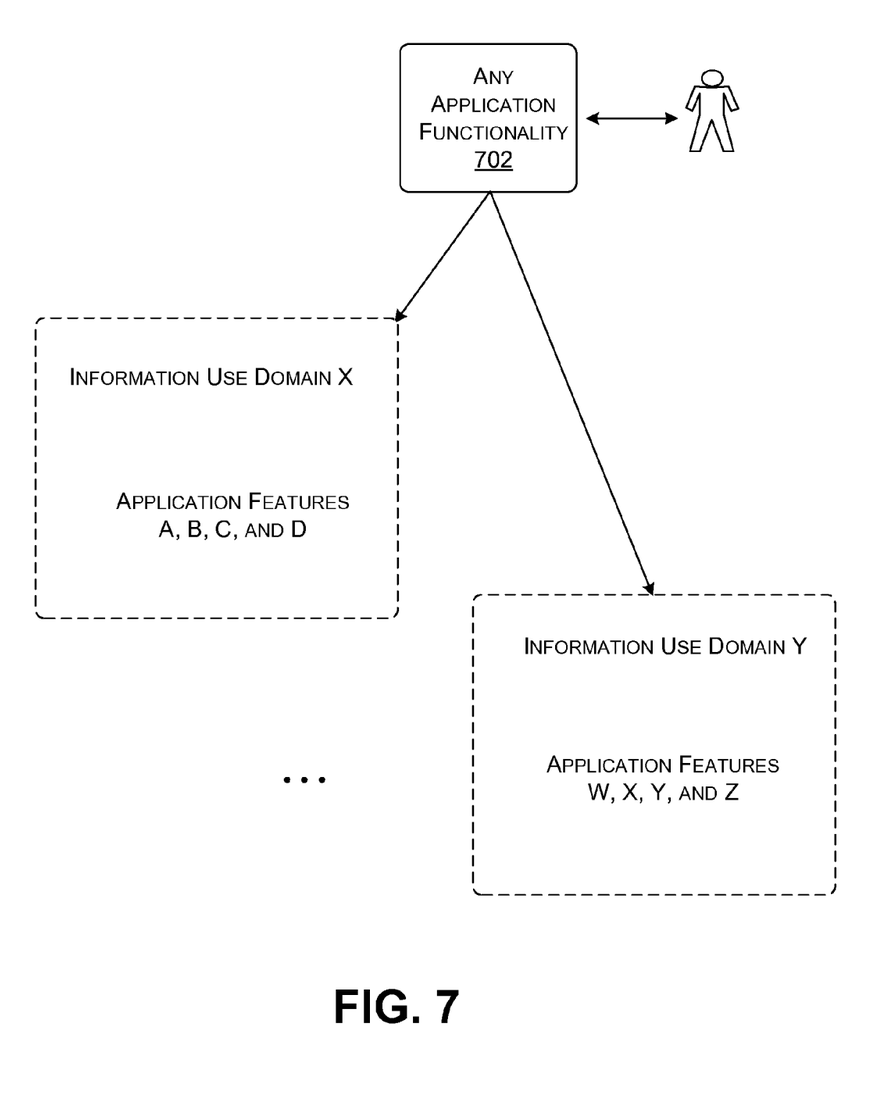
FIG. 7 shows an example of application functionality which provides features which involve different uses of information provided by an end user. Different use conditions can be assigned to these different uses.

FIG. 7 shows a high-level representation of application functionality 702 that involves at least two distinct uses of personal information provided by the entity. Namely, the application functionality 702 includes application features A, B, C, and D that involve the use of the personal information within a first domain X. The application functionality 702 includes application features W, X, Y, and Z that involve the use of the personal information within a second domain Y, possibly in addition to the first domain X.

For example, assume that domain X is affiliated with the provider of the application functionality 702 and therefore represents a native environment in which a first level of trust applies with respect to personal information provided to the application functionality 702. In contrast, assume that domain Y is affiliated with a partner entity or the like. This domain Y may therefore represent an "external" environment in which a second, diminished, level of trust applies with respect to personal information provided to the application functionality 702.

In response, the administrator can group application features A, B, C, and D together, and group application features W, X, Y, and Z together. The administrator can then apply different use conditions to these two groups. The use condition that applies to application features W, X, Y, and Z may particularly notify the entity of the release of information to partner domain Y and risks posed thereby, and solicit the entity's consent to this release. The administrator can implement this partitioning of consent using the flat organization of FIG. 4, or the structured organization of FIG. 5, or the per-use-term organization of FIG. 6, or some other organization.

Figure 8:
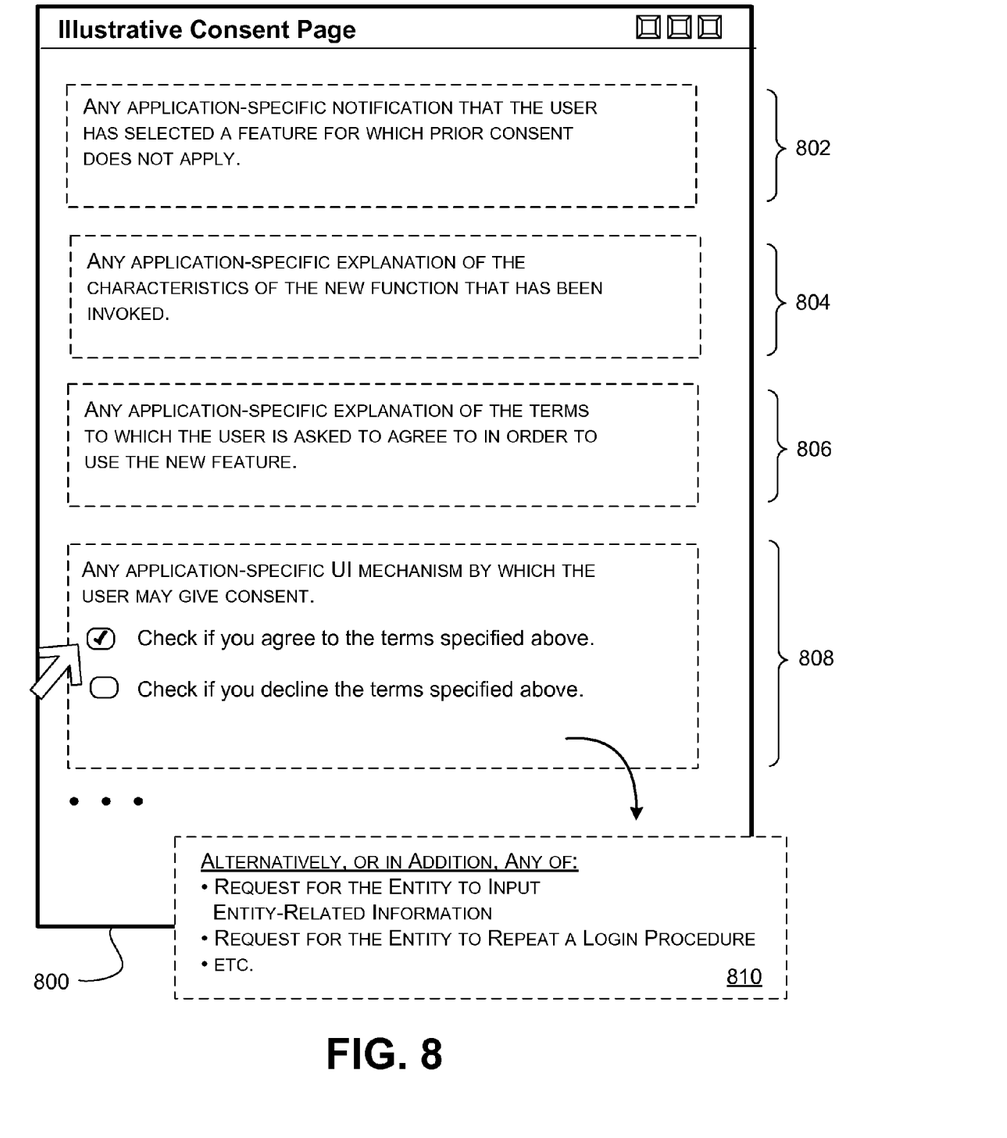
FIG. 8 shows an illustrative user interface presentation by which the consent management system (of FIG. 1) can solicit consent from an entity.

FIG. 8 shows one of many types of user interface presentations 800 that the consent solicitation module 114 can use to solicit a new consent from an entity. To repeat, the consent solicitation module 114 can invoke the user interface presentation 800 (or the like) when the entity attempts to access an application feature for which he or she has not provided effective prior consent.

The user interface presentation 800 can provide any fields of pertinent information, depending on the nature of the particular application feature that is being invoked. For example, the user interface presentation 800 can provide a first field 802 that notifies the entity of the purpose of the user interface presentation 800—namely, to solicit the consent of the entity for a particular application feature. A second field 804 may describe any pertinent characteristics of the application feature that the entity is attempting to invoke. A third field 806 may describe the terms of the use condition itself. A fourth field 808 may provide a mechanism by which the entity may expressly provide consent, or alternatively decline consent. This manner of conveying consent is merely representative. For example, another user interface presentation can solicit the entity's consent for each individual term in the use condition, as set forth below. Further, in other implementations, a use condition may be conveyed over multiple pages.

The consent solicitation module 114 can implement the user interface presentation 800 in different ways. For example, in one approach, the consent solicitation module 114 can maintain a data store (not shown) of user interface pages associated with different applicable use conditions and/or application features. The consent management system 102 can link to such a data store in different ways. For example, the consent information itself (in data store 106) can provide links to appropriate user interface presentations.

As indicated by field 810, the consent solicitation module 114 (and, in particular, the verification module 118) may also apply various approaches to verify the identity of the entity who is providing consent. In one approach, the entity may interact with the application functionality 104 within a given authentication context. For example, the entity may establish his or her identity by logging in with a general-purpose ID, such as a LiveID (in the case of the authentication framework used by Microsoft® Corporation of Redmond, Wash.). If such an authentication context exists and is trusted, the verification module 118 can allow the entity to provide consent to use conditions (or individual use terms) in the manner specified above.

Alternatively, or in addition, the verification module 118 can request the entity to type in or otherwise provide entity-related information when giving consent. For example, the verification module 118 can ask the entity to type in the entity's name.

Alternatively, or in addition, the verification module 118 can request the entity to repeat a login procedure before providing consent. That is, the verification module 118 can ask the entity to supply their password and user ID, even though the entity may have already provided this information.

Alternatively, or in addition, the verification module 118 can receive a digital signature or other digital credentials from the entity (generally referred to as credential information). Such credential information can be formulated as a certificate. The verification module 118 can then verify the credential information prior to allowing the entity to provide consent. The credential information of the entity can be stored at any location or locations, e.g., by local computing functionality (as in the case of credentials 208 shown in FIG. 2), on a smart card or the like, etc.

Still other ways of verifying the identity of the entity can be used. In any case, the consent solicitation module 114 can store whatever evidence it collects (as to the identity of the entity) in the consent history (e.g., provided in data store 116).

Figure 9:
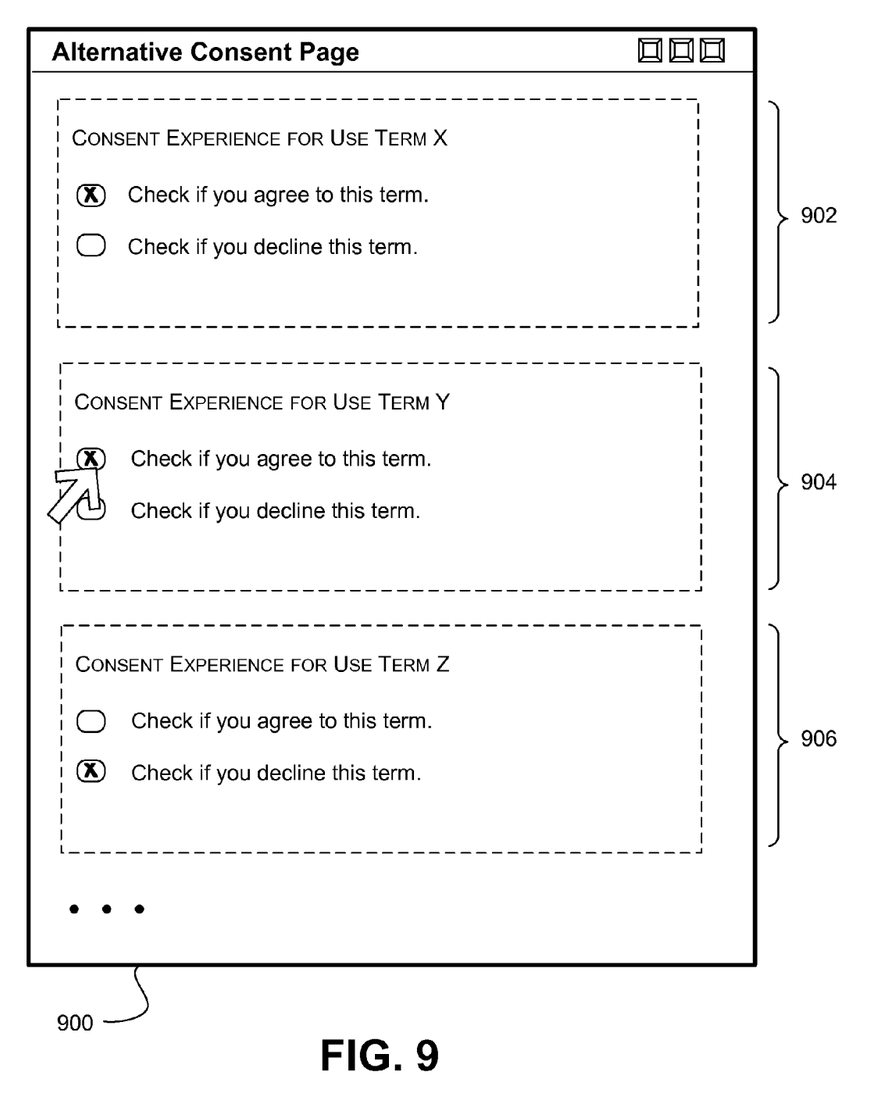
FIG. 9 shows another illustrative user interface presentation by which the consent management system can solicit consent from an entity.

FIG. 9 shows another user interface presentation 900 by which an entity may provide consent. Here, the user interface presentation 900 asks the entity to provide consent on a per-use-term level of granularity. That is, a first field 902 asks the entity to provide consent to use term X, a second field 904 asks the entity to provide consent to use term Y, and a third field 906 asks the entity to provide consent to use term Z.

The consent solicitation module 114 can present the user interface presentation 900 at different junctures. In one case, the consent solicitation module 114 can present the user interface presentation 900 when the entity attempts to access a feature for which effective consent has not been previously given. In this case, the consent solicitation module 114 can enumerate the user terms that are associated with the feature in question. The entity will be permitted to access the feature only if he or she grants consent with respect to all of the use terms. This case differs from the case of FIG. 8 in that the entity's consent to use terms carries over to other features which use the same use terms. For example, if the entity consents to use terms X and Y for feature F1, the entity will also be permitted to access feature F2, if that feature is also associated with a use condition having use terms X and Y. Alternatively, or in addition, the consent solicitation module 114 can present the entity with a master list of all applicable use terms at some initial stage of interaction. The entity can then pick out and grant consent to individual use terms in that list. The entity's particular selection will entitle it to use some features, but not others (unless the entity grants consent to all features).

B. Illustrative Processes

Figure 10:
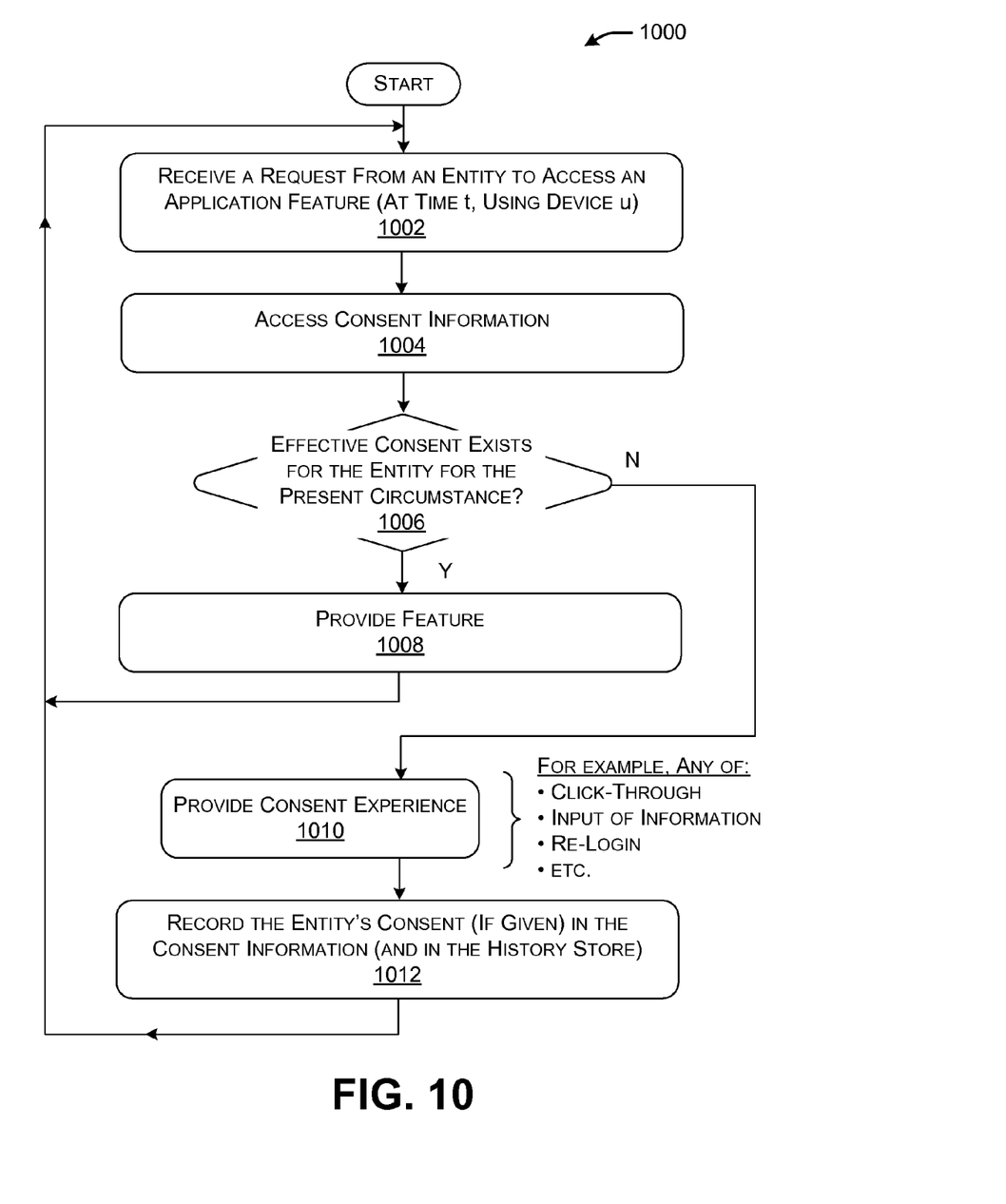
FIG. 10 is a flowchart that describes one illustrative manner of operation of the consent management system of FIG. 1.
Figure 11:
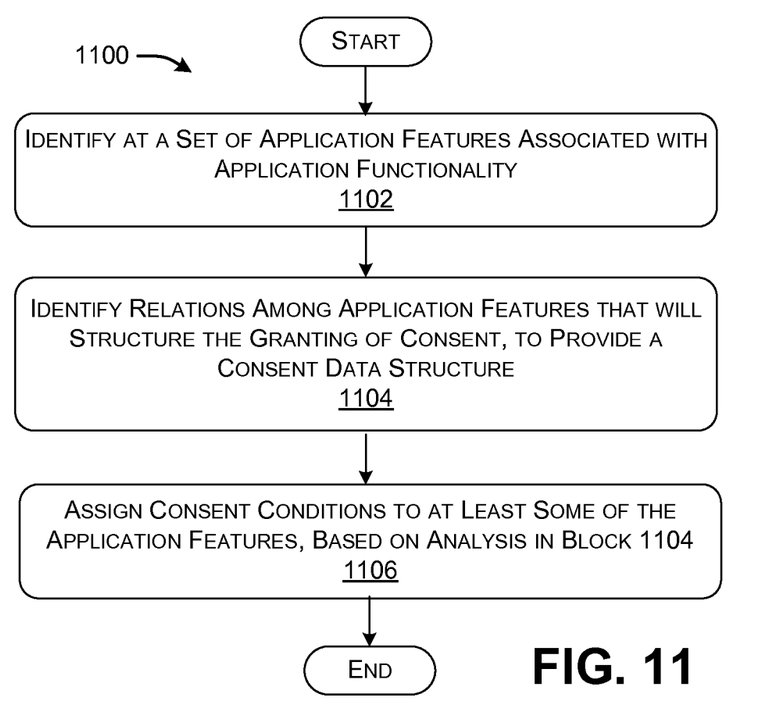
FIG. 11 is a flowchart that describes an illustrative manner of constructing the consent information.
Figure 12:
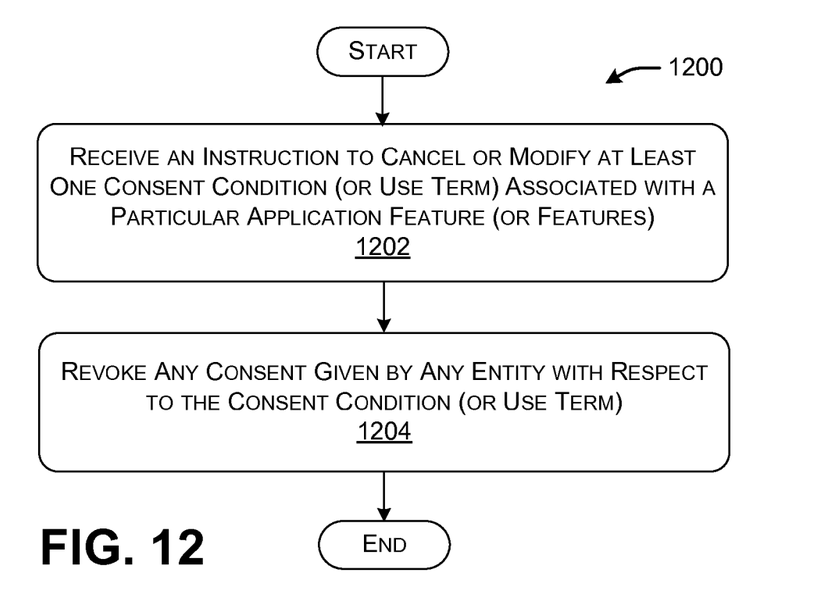
FIG. 12 is a flowchart that describes an illustrative manner of modifying the consent information provided by the consent management system.

FIGS. 10-12 show procedures that explain the operation of the consent management system 102 in flowchart form. Since the principles underlying the operation of the consent management system 102 have already been described in Section A, certain operations will be addressed in summary fashion in this section.

Starting with FIG. 10, in block 1002, the consent management system 102 receives a request from an entity (e.g., a user) to access an application feature within the application functionality 104. The entity may make this request at a particular time t, using a particular device u, defining, in part, the current circumstance in which the entity seeks to use the requested feature. In block 1004, the consent management system 102 accesses the consent information. Based thereon, in block 1006, the consent management system 102 determines whether the entity has given prior consent to access the application feature in question, and whether that consent is presently effective with respect to a present circumstance. If so, in block 1008, the consent management system 102 permits the entity to access and utilize the application feature. If not, in block 1010, the consent management system 102 provides a consent experience that solicits the consent from the entity. The entity may give consent or decline consent in response to this invitation. In block 1012, the consent management system 102 can record the entity's consent (if given) in both the consent information (e.g., in data store 106) and the consent history (e.g., in data store 116). The consent management system 102 can also record appropriate evidence that the entity has given consent. If the entity declines the solicitation, then the consent management system 102 can direct the entity back into an application feature to which he or she has given consent.

FIG. 11 shows a procedure 1100 by which an administrator may create a consent data structure, such as the consent data structure 500 shown in FIG. 5 or the consent information 600 shown in FIG. 6. In block 1102, an administrator or developer (or other agent) can identify a set of application features associated with the application functionality 104. In block 1104, the administrator can identify relations among application features that will structure the granting of consent in a desired manner. FIG. 7 (as described above) depicts an example of how an administrator might approach this task for one particular application environment. In block 1106, the administrator can assign use conditions to at least a subset of application features within the data structure thus defined.

FIG. 12 shows a procedure 1200 by which the consent management system 102 can respond to changes in the consent data structure. In block 1202, the consent management system 102 can receive instructions to cancel or modify one or more use conditions (or use terms) associated with one or more application features. Cancellation can entail outright removal of a use condition (or use term) or just a resetting of the use condition (or use term) for any reason. In block 1204, the consent management system 102 can revoke a consent given by any entity for any use condition (or use term) that has been canceled or modified.

C. Representative Processing Functionality

FIG. 13 sets forth illustrative electrical data processing functionality 1300 (also referred to herein a computing functionality) that can be used to implement any aspect of the functions described above. For example, the processing functionality 1300 can be used to implement any aspect of the consent management system 102. In one case, the processing functionality 1300 may correspond to any type of computing device that includes one or more processing devices. In all cases, the electrical data processing functionality 1300 represents one or more physical and tangible processing mechanisms.

The processing functionality 1300 can include volatile and non-volatile memory, such as RAM 1302 and ROM 1304, as well as one or more processing devices 1306 (e.g., one or more CPUs, and/or one or more GPUs, etc.). The processing functionality 1300 also optionally includes various media devices 1308, such as a hard disk module, an optical disk module, and so forth. The processing functionality 1500 can perform various operations identified above when the processing device(s) 1506 executes instructions that are maintained by memory (e.g., RAM 1502, ROM 1504, or elsewhere).

More generally, instructions and other information can be stored on any computer readable medium 1310, including, but not limited to, static memory storage devices, magnetic storage devices, optical storage devices, and so on. The term computer readable medium also encompasses plural storage devices. In all cases, the computer readable medium 1310 represents some form of physical and tangible mechanism.

The processing functionality 1300 also includes an input/output module 1312 for receiving various inputs (via input modules 1314), and for providing various outputs (via output modules). One particular output mechanism may include a presentation module 1316 and an associated graphical user interface (GUI) 1318. The processing functionality 1300 can also include one or more network interfaces 1320 for exchanging data with other devices via one or more communication conduits 1322. One or more communication buses 1324 communicatively couple the above-described components together.

The communication conduit(s) 1322 can be implemented in any manner, e.g., by a local area network, a wide area network (e.g., the Internet), etc., or any combination thereof. The communication conduit(s) 1322 can include any combination of hardwired links, wireless links, routers, gateway functionality, name servers, etc., governed by any protocol or combination of protocols.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving, by a consent management system implemented by a computing device, a lookup request from a website in response to an attempt by an entity to access a particular application feature provided by application functionality of the web site;
accessing, by the consent management system, a data store that maintains consent information, the consent information identifying use conditions associated with respective application features provided by the application functionality of the web site and identifying entities that have previously given consent to the use conditions, wherein separate use conditions are associated with the particular application feature and at least one different application feature, each separate use condition specifying a different manner in which a provider of the web site is permitted to use personal information provided by the entities;
determining, by the consent management system, whether the entity has previously given consent to a use condition associated with the particular application feature and, if so, whether the consent previously given by the entity to the use condition associated with the particular application feature is presently effective;
permitting, by the consent management system, the entity to access the particular application feature when it is determined that the consent previously given by the entity to the use condition associated with the particular application feature is presently effective; and
presenting, by the consent management system to the entity, a user interface which solicits consent to the use condition associated with the particular application feature if it is determined that the entity has not previously given consent to the use condition associated with the particular application feature or it is determined that the consent previously given by the entity to the use condition associated with the particular application feature is not presently effective.

2. The method of claim 1, wherein the application functionality pertains to a health-related field.

3. The method of claim 1, wherein the particular application feature and the at least one different application feature are affiliated with different domains, and wherein different levels of trust apply in the different domains with respect to personal information.

4. The method of claim 1, wherein the consent previously given by the entity to the use condition associated with the particular application feature is determined to be presently effective when:
a time at which the entity attempts to access the particular application feature satisfies a temporal attribute of the use condition associated with the particular application feature; and
a device with which the entity attempts to access the particular application feature satisfies an access-related attribute of the use condition associated with the particular application feature.

5. The method of claim 1, wherein the consent information has a flat structure that maps the use conditions to the respective application features.

6. The method of claim 1, wherein the consent information has a hierarchical data structure that identifies a hierarchy of the respective application features.

7. The method of claim 6, wherein a child application feature in the consent information inherits any use condition associated with any associated parent application feature and any associated ancestor application feature.

8. The method of claim 1, wherein the consent information identifies a plurality of use terms, and wherein the consent information includes a mapping structure which maps the use terms to the use conditions associated with the respective application features.

9. The method of claim 1, further comprising:
storing, by the consent management system in the data store, use conditions received from an administrator.

10. The method of claim 1, further comprising:
storing, by the consent management system in the data store, consent information received via the user interface.

11. The method of claim 1, wherein the user interface solicits consent to the use condition associated with the particular application feature by one or more of:
requesting the entity to input entity-related information;
requesting the entity to repeat a login procedure; or
receiving credential information from the entity.

12. The method of claim 1, further comprising:
recording, by the consent management system, any consent given by the entity with respect to any use condition in a consent history; and providing at least one of an administrator or the entity with access to the consent history.

13. The method of claim 1, further comprising:
receiving, by the consent management system from an administrator, an instruction to modify the use condition in associated with the particular application feature; and
revoking, by the consent management system, any consent previously given by any entity to the use condition associated with the particular application feature.

14. The method of claim 13, wherein the revoking of any consent previously given by any entity to the use condition associated with the particular application feature operates to:
revoke any consent previously given by any entity to any use condition associated with any child application feature of the particular application feature, without revoking any consent previously given by any entity to any use condition associated with any parent application feature of the particular application feature.

15. A computing system comprising:
a processing device configured to execute computer readable instructions; and
memory storing computer readable instructions that, when executed by the processing device, implement a consent management system comprising:
a consent lookup module configured to:
receive a lookup request from a website in response to an attempt by an entity to access a particular application feature provided by application functionality of the web site;
access a data store that maintains consent information, the consent information identifying use conditions associated with respective application features provided by the application functionality of the web site and identifying entities that have previously given consent to the use conditions, wherein separate use conditions are associated with the particular application feature and at least one different application feature, each separate use condition specifying a different manner in which a provider of the web site is permitted to use personal information provided by the entities;

determine whether the entity has previously given consent to a use condition associated with the particular application feature and, if so, whether the consent previously given by the entity to the use condition associated with the particular application feature is presently effective; and permit the entity to access the particular application feature when it is determined that the consent previously given by the entity to the use condition associated with the particular application feature is presently effective;

a consent solicitation module configured to:

present, to the entity, a user interface which solicits consent to the use condition associated with the particular application feature if it is determined that the entity has not previously given consent, to the use condition associated with the particular application feature or it is determined that the consent previously given by the entity to the use condition associated with the particular application feature is not presently effective; and a consent maintenance module configured to:

receive, from an administrator, an instruction to modify the use condition associated with the particular application feature; and revoke any consent given by any entity to the use condition associated with the particular application feature.

16. The computing system of claim 15, wherein the consent solicitation module solicits consent to the use condition associated with the particular application feature by one or more of:

requesting the entity to input entity-related information;
requesting the entity to repeat a login procedure; or
receiving credential information from the entity.

17. The computing system of claim 15, wherein the consent solicitation module is configured to record any consent received via the user interface.

18. A computer readable storage device storing computer readable instructions that, when executed by a computing device, cause the computing device to:

receive a lookup request from a website in response to an attempt by an entity to access a particular application feature provided by application functionality of the web site;

access a data store that maintains consent information, the consent information identifying use conditions associated with respective application features of the web site and identifying entities that have previously given consent to the use conditions, wherein separate use conditions are associated with the particular application feature and at least one different application feature, each separate use condition specifying a different manner in which a provider of the web site is permitted to use personal information provided by the entities;

determine whether the entity has previously given consent to a use condition associated with the particular application feature and, if so, whether the consent previously given by the entity the use condition associated with the particular application feature is presently effective;

permit the entity to access the particular application feature when it is determined that the consent previously given by the entity to the use condition associated with the particular application feature is presently effective; and present, to the entity, a user interface which solicits consent to the use condition associated with the particular application feature if it is determined that the entity has not previously given consent to the particular application feature or it is determined that the consent previously given by the entity to the use condition associated with the particular application feature is not presently effective.

19. The computer readable storage device of claim 18, wherein the user interface solicits consent to the use condition associated with the particular application feature by one or more of:

requesting the entity to input entity-related information;
requesting the entity to repeat a login procedure; or
receiving credential information from the entity.

20. The computer readable storage device of claim 18, further storing computer readable instructions that cause the computing device to:

receive, from an administrator, an instruction to modify the use condition associated with the particular application feature; and revoke any consent given by any entity to the use condition associated with the particular application feature.

\* \* \* \* \*